May 1, 1962  C. H. GLEASON  3,032,469
LONG ACTING STEROID COMPOUNDS
Filed May 2, 1958  2 Sheets-Sheet 1

Inventor
CLARENCE H. GLEASON
By Cushman, Darby & Cushman
Attorneys

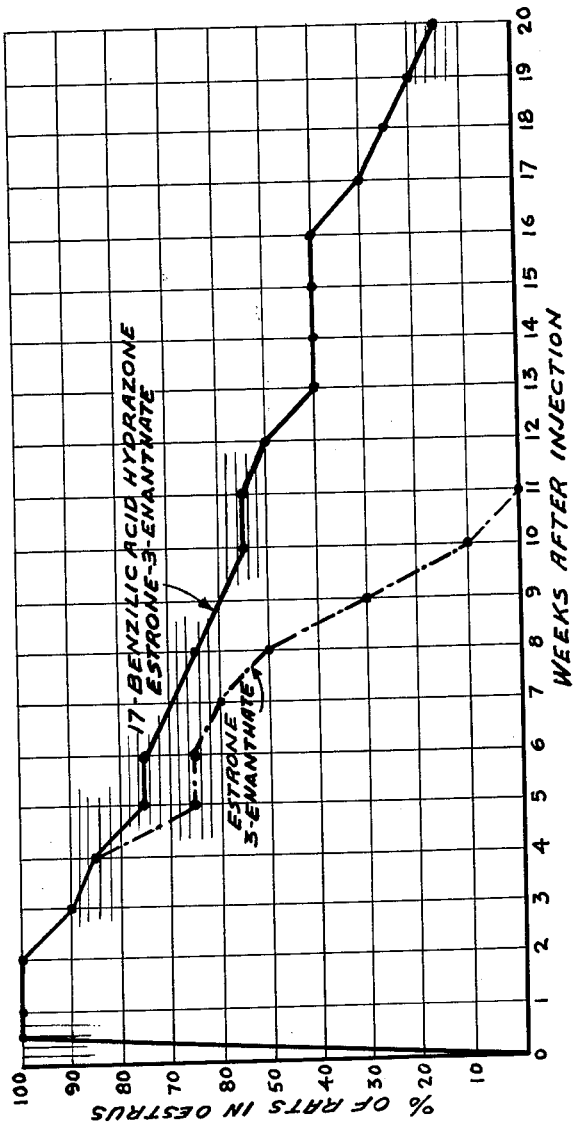

United States Patent Office 3,032,469
Patented May 1, 1962

3,032,469
LONG ACTING STEROID COMPOUNDS
Clarence H. Gleason, Montreal, Quebec, Canada, assignor to Charles E. Frosst & Company, Montreal, Quebec, Canada, a corporation of Quebec
Filed May 2, 1958, Ser. No. 732,490
4 Claims. (Cl. 167—65)

The present invention relates to novel biologically active steroid compounds having strongly marked protracted effect. More particularly, it relates to hydrazone derivatives of steroid esters.

In accordance with the present invention, there is now provided a new series of biologically long-acting steroid hormone derivatives having the general formula:

R—NH—N= . . . A . . . OR₁ wherein R is a radical of the general formula:

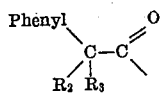

wherein $R_2$ is selected from the group consisting of H and phenyl radicals and $R_3$ is selected from the group consisting of hydrogen and hydroxy radicals.

. . . A . . .

is a cyclopentanohydrophenanthrene nucleus to which is linked a hydrazone radical and the OR₁ group is a group which is positioned in at least one of the positions -3, -17 and -21 of the cyclopentanohydrophenanthrene nucleus . . . A . . ., and R₁ is an acyl radical of a monocarboxylic acid containing from two to ten carbon atoms and selected from the group consisting of aliphatic hydrocarbon acids, cycloaliphatic hydrocarbon acids and benzoic acid.

These new steroid hormone derivatives are obtained by the reaction of a keto-steroid of the formula

O= . . . A . . . OR₁ wherein the keto group is a reactive keto group which is preferably in the 3 or 17 position with a hydrazide of the formula R—NH—NH₂ in the presence of an indifferent solvent.

Alternatively, the novel steroids of the present invention can be prepared by first reacting a steroid of the general formula O=A . . . OH with a hydrazide of the formula RNHNH₂ to give the corresponding hydrazone steroid of the formula RNHN= . . . A . . . OH and then esterifying the reactive hydroxyl group to give the desired steroid of the formula

RNHN= . . . A . . . OR₁

In order to fully understand the scope of the present invention, the novel hydrazones corresponding to the following general formulae may be obtained:

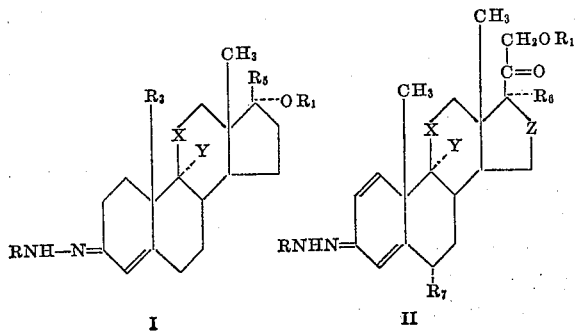

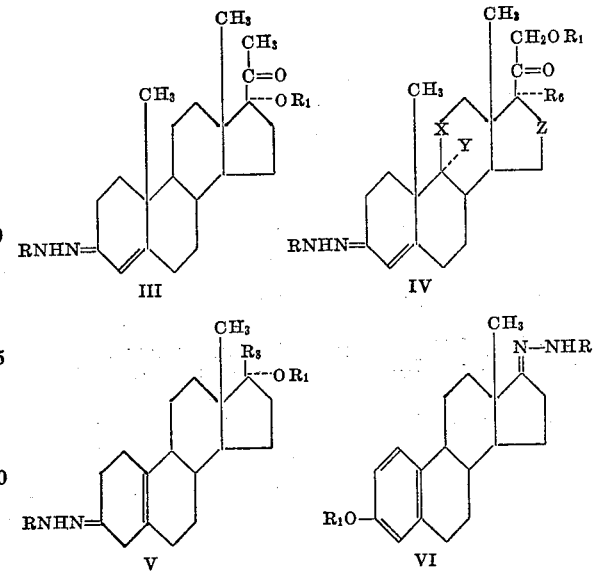

wherein:

R, and R₁ are as defined above,
R₄ is a radical selected from the group consisting of hydrogen and methyl
R₅ is a radical selected from the group consisting of hydrogen, lower alkyl radical and an alkynyl radical of from 2 to 6 carbon atoms
R₆ is a radical selected from the group consisting of hydrogen, hydroxy and —OR₁
R₇ is a radical selected from the group consisting of hydrogen, and lower alkyl
R₈ is an alkynyl radical of from two to six carbon atoms
X is a radical selected from the group consisting of CH₂, C=O, and CHOH radicals
Y is a radical selected from the group consisting of halogen and hydrogen, and
Z is a radical selected from the group consisting of CH₂ and CHOH.

The choice of the starting steroid is predicated on the presence of a reactive keto-group in positions 3- or 17- and a hydroxyl group in positions 17- or 3- and in some compounds such as those of group IV in the 21-position, which can be subsequently converted to an ester group by reaction with an appropriate esterifying agent.

As an example of the starting compounds suitable for obtaining the hydrazones of group I, there may be mentioned the 17-esters of testosterone, for example, testosterone-17-propionate,
testosterone-17-enanthate,
testosterone-17-cyclopentylpropionate,
testosterone-17-benzoate; the
17α-alkynyl-17-esters of testosterone such as
17α-ethinyl-17-acetate testosterone,
17α-ethinyl-17-enanthate testosterone,
17α-ethinyl-17-cyclopentylpropionate-testosterone,
17α-ethinyl-17-benzoate-testosterone,
17α-propargyl-17-propionate-testosterone,
17α-propargyl-17-pelargonate-testosterone,
17α-propargyl-17-cyclohexylpropionate-testosterone,
17α-propargyl-17-benzoate-testosterone; the
17α-alkyl-17-esters of testosterone such as
17α-methyl-17-propionate-testosterone,
17α-methyl-17-caproate-testosterone,
17α-methyl-17-enanthate-testosterone,
17α-methyl-17-cyclopentylformate-testosterone,
17α-methyl-17-cycloheptylformate-testosterone,
17-ethyl-17-butyrate-testosterone, 17-ethyl-17-valerianate-testosterone,
17-ethyl-17-hexahydrobenzoate-testosterone,
17-ethyl-17-trimethylacetate-testosterone,
17-ethyl-17-benzoate-testosterone; the
19-nor-testosterone-17-esters, for example,
19-nor-testosterone-17-acetate,
19-nor-testosterone-17-isobutyrate,
19-nor-testosterone-17-cyclopentylacetate,
19-nor-testosterone-17-cyclopropylformate,
19-nor-testosterone-17-benzoate; the
17α-alkynyl-17-esters-19-nor-testosterone, such as
17α-ethinyl-17-propionate-19-nor-testosterone,
17α-ethinyl-17-enanthate-19-nor-testosterone,
17α-ethinyl-17-cyclopentylpropionate-19-nor-testosterone,
17α-ethinyl-17-benzoate-19-nor-testosterone,
17α-propargyl-17-propionate-19-nor-testosterone,
17α-propargyl-17-pelargonate-19-nor-testosterone,
17α-propargyl-17-cyclohexylpropionate-19-nor-testosterone, and
17α-propargyl-17-benzoate-19-nor-testosterone; the
11β-hydroxy-9α-halo-17-alkyl-17-esters-testosterone such as
11β-hydroxy-9α-fluoro-17-methyl-17-propionate-testosterone,
11β-hydroxy-9α-fluoro-17-methyl-17-enanthate testosterone,
11β-hydroxy-9α-fluoro-17-methyl-17-caproate-testosterone,
11β-hydroxy-9α-fluoro-17-methyl-17-cyclopentylacetate-testosterone,
11β-hydroxy-9α-fluoro-17-methyl-17β-cyclobutyl-propionate-testosterone,
11β-hydroxy-9α-fluoro-17-methyl-17-benzoate-testosterone, and
11-keto-9α-halo-17-alkyl-17 esters-testosterone, for example
11-keto-9α-fluoro-17-methyl-17-propionate-testosterone,
11-keto-9α-fluoro-17-methyl-17-cyclopentylpropionate-testosterone and
11-keto-9α-fluoro-17-methyl-17-benzoate, and other derivatives thereof.

When reacting the above starting materials with a hydrazide of the formula RNHNH$_2$, the corresponding hydrazones are obtained: the 3-hydrazones-17-esters of testosterone, for example, 3-benzilic acid hydrazone-testosterone-17-propionate,
3-mandelic acid hydrazone-testosterone-17-enanthate,
3-phenylacetic acid hydrazone-testosterone-17- cyclopentylpropionate,
3-diphenylacetic acid hydrazone-testosterone-17- benzoate; the
3-hydrazones-17α-alkynyl-17-esters of testosterone such as
3-benzilic acid hydrazone-17α-ethinyl-17-acetate testosterone,
3-mandelic acid hydrazone-17α-ethinyl-17-enanthate testosterone,
3-phenylacetic acid hydrazone-17α-ethinyl-17-cyclopentylpropionate-testosterone,
3-diphenylacetic acid hydrazone-17α-ethinyl-17-benzoate-testosterone,
3-benzilic acid hydrazone-17α-propargyl-17-propionate-testosterone,
3-mandelic acid hydrazone-17α-propargyl-17-pelargonate-testosterone,
3-phenylacetic acid hydrazone-17α-propargyl-17-cyclohexylpropionate-testosterone,
3-diphenylacetic acid hydrazone-17α-propargyl-17-benzoate-testosterone; the
3-hydrazones-17α-alkyl-17-esters of testosterone such as
3-benzilic acid hydrazone - 17α - methyl-17-propionate-testosterone,
3-mandelic acid hydrazone-17α-methyl-17-caproate-testosterone,
3-phenylacetic acid hydrazone-17α-methyl-17-enanthate-testosterone,
3-diphenylacetic acid hydrazone - 17α - methyl-17-cyclopentyl-formate-testosterone,
3-benzilic acid hydrazone - 17α - methyl - 17-cycloheptyl-formate-testosterone,
3-mandelic acid hydrazone-17-ethyl-17-butyrate-testosterone,
3 - phenylacetic acid hydrazone - 17-ethyl-17-valerianate-testosterone,
3-diphenylacetic acid hydrazone-17-ethyl-17-hexahydrobenzoate testosterone,
3-benzilic acid hydrazone-17-ethyl-17-trimethylacetate-testosterone,
3-mandelic acid hydrazone-17-ethyl-17-benzoate-testosterone; the
3-hydrazones-19-nor-testosterone-17-esters, for example,
3-benzilic acid hydrazone-19-nor-testosterone-17-acetate,
3 - mandelic acid hydrazone - 19-nor-testosterone-17-isobutyrate,
3 - phenylacetic acid hydrazone - 19-nor-testosterone-17-cyclopentylacetate,
3-diphenylacetic acid hydrazone-19-nor-testosterone-17-cyclopropylformate,
3-benzilic acid hydrazone-19-nor-testosterone-17-benzoate; the
3-hydrazones-17α-alkynyl-17-esters-19-nor-testosterone, such as
3-benzilic acid hydrazone-17α-ethinyl-17-propionate-19-nor testosterone,
3-mandelic acid hydrazone-17α-ethinyl-17-enanthate-19-nor testosterone,
3 - phenylacetic acid hydrazone - 17α - ethinyl-17-cyclopentylpropionate-19-nor-testosterone,
3-diphenylacetic acid hydrazone-17α-ethinyl-17- benzoate-19-nor-testosterone,
3-benzilic acid hydrazone-17α-propargyl-17-propionate-19-nor-testosterone,
3-phenylacetic acid hydrazone-17α-propargyl-17-pelargonate-19-nor-testosterone,
3-diphenylacetic acid hydrazone-17α-propargyl-17-cyclohexylpropionate-19-nor-testosterone and
3-benzilic acid hydrazone-17α-propargyl-17-benzoate-19-nor-testosterone; the
3-hydrazones-11β-hydroxy-9α-halo-17-alkyl-17-esters-testosterone, such as
3-benzilic acid hydrazone - 11β - hydroxy - 9α-fluoro-17-methyl-17-propionate-testosterone,
3-mandelic acid hydrazone - 11β - hydroxy-9α-fluoro-17-methyl-17-enanthate testosterone,
3-phenylacetic acid hydrazone-11β-hydroxy-9α-fluoro-17-methyl-17-caproate-testosterone,
3-diphenylacetic acid hydrazone-11β-hydroxy-9α-fluoro-17-methyl-17-cyclopentylacetate-testosterone,
3-benzilic acid hydrazone - 11β - hydroxy - 9α-fluoro-17-methyl-17β-cyclobutylpropionate-testosterone,
3 - mandelic acid hydrazone - 11β - hydroxy-9α-fluoro-17-methyl-17-benzoate-testosterone, and
3-hydrazones-11-keto-9α-halo-17-alkyl-17-esters-testosterone, for example,
3-benzilic acid hydrazone - 11 - keto-9α-fluoro-17-methyl-17-propionate-testosterone,
3-mandelic acid hydrazone-11-keto-9α-fluoro-17-methyl-17-cyclopentylpropionate-testosterone and
3-phenylacetic acid hydrazone-11 - keto - 9α - fluoro-17-methyl-17-benzoate, and derivatives thereof.

As an example of suitable starting materials for obtaining the hydrazones of group II, there may be mentioned the Δ$^{1,4}$-pregnenes, such as prednisolone- or prednisone-21-esters, for example, prednisone-21-acetate,
prednisone-21-butyrate, prednisone-21β-cyclopentylpropionate,
prednisone-21β-hexahydrobenzoate,
prednisone-21β-benzoate,
prednisolone-21-propionate,
prednisolone-21-enanthate,
prednisolone-21-hexahydrobenzoate,
prednisolone-21-benzoate and derivatives thereof such as
9α-fluoro-16α-hydroxy-prednisolone-21-propionate,
9α-fluoro-16α-hydroxy-prednisolone-21-butyrate,
9α-fluoro-16α-hydroxy-prednisolone-21-cyclopentylpropionate and
9α-fluoro-16α-hydroxy-prednisolone-21- benzoate; and
6-α-methyl-prednisolone-21-esters, for example,
6α-methyl-prednisolone-21-acetate,
6α-methyl-prednisolone-21-butyrate,
6α-methyl-prednisolone-21-enanthate,
6α-methyl-prednisolone-21-cyclopentylpropionate, and
6α-methyl-prednisolone-21-benzoate.

When reacting these starting materials with a hydrazide of the formula $RNHNH_2$, there are obtained the following hydrazones: the 3-hydrazones-prednisolone- or prednisone-21-esters, for example,
3-benzilic acid hydrazone-prednisone-21-acetate,
3-mandelic acid hydrazone-prednisone-21-butyrate,
3 - phenylacetic acid hydrazone - prednisone - 21β-cyclopentylpropionate,
3-diphenylacetic acid hydrazone-prednisone-21β-hexahydrobenzoate,
3-benzilic acid hydrazone-prednisone-21β-benzoate,
3-mandelic acid hydrazone-prednisolone-21-propionate,
3-phenylacetic acid hydrazone-prednisolone-21-enanthate,
3-diphenylacetic acid hydrazone-prednisolone-21-hexahydrobenzoate,
3-benzilic acid hydrazone-prednisolone-21-benzoate, and derivatives thereof such as
3-benzilic acid hydrazone-9α-fluoro-16α-hydroxy-prednisolone-21-propionate,
3-mandelic acid hydrazone-9α-fluoro-16αhydroxy-prednisolone-21-butyrate,
3-phenylacetic acid hydrazone - 9α - fluoro-16α-hydroxy-prednisolone-21-cyclopentylpropionate and
3-diphenylacetic acid hydrazone-9α-fluoro-16α-hydroxy-prednisolone-21-benzoate and
3-hydrazones-6α-methyl-prednisolone-21-esters, for example,
3-benzilic acid hydrazone - 6α - methyl-prednisolone-21-acetate,
3-mandelic acid hydrazone-6α-methyl-prednisolone-21-butyrate,
3-phenylacetic acid hydrazone-6α-methyl-prednisolone-21-enanthate,
3-diphenylacetic acid hydrazone-6α-methyl-prednisolone-21-cyclopentylpropionate, and
3-phenylacetic acid hydrazones-6α-methyl-prednisolone-21-benzoate.

As an example of suitable starting materials for obtaining the hydrazones of group III, there may be mentioned the 17α-hydroxy-esters of progesterone, such as 17α-caproate progesterone, 17α-butyrate progesterone, 17α-enanthate progesterone, and derivatives thereof.

When reacting these starting materials with a hydrazide of the formula $RNHNH_2$, there are obtained the following hydrazones: the 3-hydrazones-17α-hydroxy-esters of progesterone such as 3-benzilic acid hydrazone-17α-caproate progesterone, 3-mandelic acid hydrazone-17α-butyrate progesterone, 3 - phenylacetic acid hydrazone17-α-enanthate progesterone, and derivatives thereof.

As an example of suitable starting materials for obtaining the hydrazones of group IV, there may be mentioned desoxycorticosterone-21-esters such as desoxycorticosterone-21-enanthate and desoxycorticosterone-21-trimethylacetate; cortisone-21-esters such as cortisone-21-butyrate,
cortisone-21-enanthate,
cortisone-21-pelargonate,
cortisone-21-hexahydrobenzoate,
cortisone-21-benzoate;
hydrocortisone-21-esters such as
hydrocortisone-21-enanthate,
hydrocortisone-21-hexahydrobenzoate,
hydrocortisone-21-benzoate and
derivatives thereof, such as
9α-fluoro-hydrocortisone-21-acetate,
9α-fluoro-hydrocortisone-21-butyrate,
9α-fluoro-hydrocortisone-21-enanthate,
9α-fluoro-hydrocortisone-21-cyclohexylformate,
9α-fluoro-hydrocortisone-21-benzoate; and
9α-fluoro-cortisone-21-propionate,
9α-fluoro-cortisone-21-caproate,
9α-fluoro-cortisone-21-pelargonate,
9α-fluoro-cortisone-21-cyclopentylpropionate,
9α-fluoro-cortisone-21-hexahydrobenzoate, and
9α-fluoro-cortisone-21-benzoate.

When reacting the above starting materials with a hydrazide of the formula $RNHNH_2$, the corresponding hydrazones are obtained:

3-hydrazones-desoxycorticosterone-21-esters, such as,
3-benzilic acid hydrazone-desoxycorticosterone-21-enanthate and
3-mandelic acid hydrazone-desoxycorticosterone-21-trimethylacetate;
3-hydrazones-cortisone-21-esters, such as
3-benzilic acid hydrazone-cortisone-21-butyrate,
3-mandelic acid hydrazone-cortisone-21-enanthate,
3-phenylacetic acid hydrazone-cortisone-21-pelargonate,
3-diphenylacetic acid hydrazone-cortisone-21-hexahydrobenzoate,
3-benzilic acid hydrazone-cortisone-21-benzoate;
3-hydrazones-hydrocortisone-21-esters such as
3-benzilic acid hydrazone-hydrocortisone-21-enanthate,
3-mandelic acid hydrazone-hydrocortisone-21-hexahydrobenzoate,
3-phenylacetic acid hydrazone-hydrocortisone-21-benzoate and derivatives thereof, such as,
3-benzilic acid hydrazone-9α-fluoro-hydrocortisone-21-acetate,
3-mandelic acid hydrazone-9α-fluoro-hydrocortisone-21-butyrate,
3-phenylacetic acid hydrazone-9α-fluoro-hydrocortisone-21-cyclohexylformate,
3-diphenyl-acetic acid hydrazone-9α-fluoro-hydrocortisone-21-enanthate,
3-benzilic acid hydrazone-9α-fluoro-hydrocortisone-21-benzoate; and
3-benzilic acid hydrazone-9α-fluoro-cortisone-21-propionate,
3-mandelic acid hydrazone-9α-fluoro-cortisone-21-caproate,
3-phenylacetic acid hydrazone-9α-fluoro-cortisone-21-pelargonate,
3-diphenylacetic acid hydrazone-9α-fluoro-cortisone-21-cyclopentylpropionate,
3-benzilic acid hydrazone-9α-fluoro-cortisone-21-hexahydrobenzoate and
3-mandelic acid hydrazone-9α-fluoro-cortisone-21-benzoate.

As an example of suitable starting compounds for obtaining the hydrazones of group V, there may be mentioned 17α-alkynyl-17-hydroxy esters of $\Delta^{5(10)}$-estrene-3-one, for example, 17α-ethinyl-17-propionate-$\Delta^{5(10)}$-estrene-3-one,
17α-ethinyl-17-hexahydrobenzoate-$\Delta^{5(10)}$-estrene-3-one,
17α-ethinyl-17-benzoate-$\Delta^{5(10)}$-estrene-3-one,
17α-propargyl-17-acetate-$\Delta^{5(10)}$-estrene-3-one,
17α-propargyl-17-enanthate-$\Delta^{5(10)}$-estrene-3-one,
17α-propargyl-17-pelargonate-$\Delta^{5(10)}$-estrene-3-one, 17α-propargyl-17-cyclohexylformate-$\Delta^{5(10)}$-estrene-3-one,
17α-propargyl-17-benzoate-$\Delta^{5(10)}$-estrene-3-one.

When reacting the above starting materials with a hydrazide of the formula $RNHNH_2$, the corresponding hydrazones are obtained: the 17α-alkynyl-17-hydroxy esters of $\Delta^{5(10)}$-estrene-3-acid hydrazones, for example, 17α-ethinyl-17-propionate-$\Delta^{5(10)}$-estrene-3-benzilic acid hydrazone,
17α-ethinyl-17-hexahydrobenzoate-$\Delta^{5(10)}$-estrene-3-mandelic acid hydrazone,
17α-ethinyl-17-benzoate-$\Delta^{5(10)}$-estrene-3-phenylacetic acid hydrazone,
17α-propargyl-17-acetate-$\Delta^{5(10)}$-estrene-3-diphenylacetic acid hydrazone,
17α-propargyl-17-enanthate-$\Delta^{5(10)}$-estrene-3-benzilic acid hydrazone,
17α-propargyl-17-pelargonate-$\Delta^{5(10)}$-estrene-3-mandelic acid hydrazone,
17α-propargyl-17-cyclohexylformate-$\Delta^{5(10)}$-estrene-3-phenylacetic acid hydrazone,
17α-propargyl-17-benzoate-$\Delta^{5(10)}$-estrene-3-diphenylacetic acid hydrazone.

As an example of suitable starting compounds for obtaining the hydrazones of group VI, there may be mentioned estrone-3-esters such as, estrone-3-propionate,
estrone-3-enanthate,
estrone-3-benzoate,
estrone-3-cyclohexylpropionate,
estrone-3-hexahydrobenzoate,
estrone-3-trimethylacetate.

When reacting the above starting materials with a hydrazide of the formula $RNHNH_2$ the corresponding hydrazones are obtained: the 17-hydrazones-estrone-3-esters such as 17-benzilic acid hydrazone-estrone-3-propionate,
17-mandelic acid hydrazone-estrone-3-enanthate,
17-phenylacetic acid hydrazone-estrone-3-benzoate,
17-diphenylacetic acid hydrazone-estrone-3-cyclohexylpropionate,
17-benzilic acid hydrazone-estrone-3-hexahydrobenzoate and
17-mandelic acid hydrazone-estrone-3-trimethylacetate.

The acyl radical $R_1$ is an acyl radical of a monocarboxylic acid of aliphatic monocarboxylic acids containing from two to ten carbon atoms, for example, acetate, propionate, butyrate, isobutyrate, trimethylacetate, valerianate, isovalerianate, caproate, enanthate; cycloaliphatic monocarboxylic acids, for example, β-cyclopentylpropionate, cyclopentylformate, cyclohexylformate, hexahydrobenzoate, cyclopentylacetate, cyclobutylformate, α-cyclopentylpropionate, cyclohexylacetate, cyclopropylformate, cycloheptylformate, β-(methylcyclopentyl)-acetate, β-(methylcyclopentyl)-propionate, β-(dimethylcyclopentyl)-propionate, β-cyclobutylpropionate, and other cycloalkanoates; and benzoate.

It is also possible that in the case of steroids having two or more active hydroxyl groups to use as starting materials, the corresponding di- or tri-esters.

Similarly, in the case of steroids having more than one reactive keto group, for example, 17α-esters of hydroxy progesterone, there may be obtained the corresponding di-hydrazone.

As an example of suitable hydrazides which can be used, there may be mentioned benzilic acid hydrazide, mandelic acid hydrazide, phenyl-acetic acid hydrazide and diphenyl-acetic acid hydrazide and other related hydrazides.

The reaction is carried out in a suitable indifferent solvent, i.e. one which is of neutral reaction with the starting hydrazide. It is advisable to add to the reaction mixture a small amount of an organic acid, for example, acetic acid, which has a catalytic effect upon the reaction and accelerates the same. If desired, the reaction of the steroid ester with the hyrazide can be carried out in the presence of pure acetic acid, i.e. without any indifferent solvent. The reaction takes place in the cold, after a more or less prolonged contact of the reaction components or by heating the reaction mixture under reflux.

As an example of the long-acting activity of the hydrazones of the present invention, it has been found that in comparison with the already known testosterone-17-enanthate, the 3-benzilic acid hydrazone derivative thereof shows a striking and surprisingly prolonged activity. The measure of the duration of action is obtained by following the change in weight of seminal vesicles and prostate of young castrated rats after a single injection of 32 mg. of the 3-benzilic acid hydrazone-testosterone-17-enanthate, which contains the same amount of testosterone (14.4 mg.) as 20 mg. of testosterone-17-enanthate. Similar results have also been found with 17-benzilic acid hydrazone-estrone-3-enanthate. In this test, ovariectomized rats are given the estrone-3-enanthate and the 17-benzilic acid hydrazone-estrone-3-enanthate in doses equivalent to 500 γ of estrone per rat. Vaginal smears are made at repeated intervals and the presence of oestrus is determined by microscopic examination of the epithelial cells of the vagina. Further 17-enanthate-progesterone-3-benzilic acid hydrazone showed prolonged progestational activity. A single 10 mg. injection was as effective as repeated daily 1 mg. injections of progesterone in suppressing corpora lutea formation in inmature female rats treated with a preliminary dose of oestradiol valerate.

The accompanying drawings show a graphical repre-sentation of such tests wherein:

FIGURE 3 shows the duration of oestrus over a period of 20 weeks using 17-benzilic acid hydrazone-estrone-3-enanthate and estrone-3-enanthate.

Figure 1:
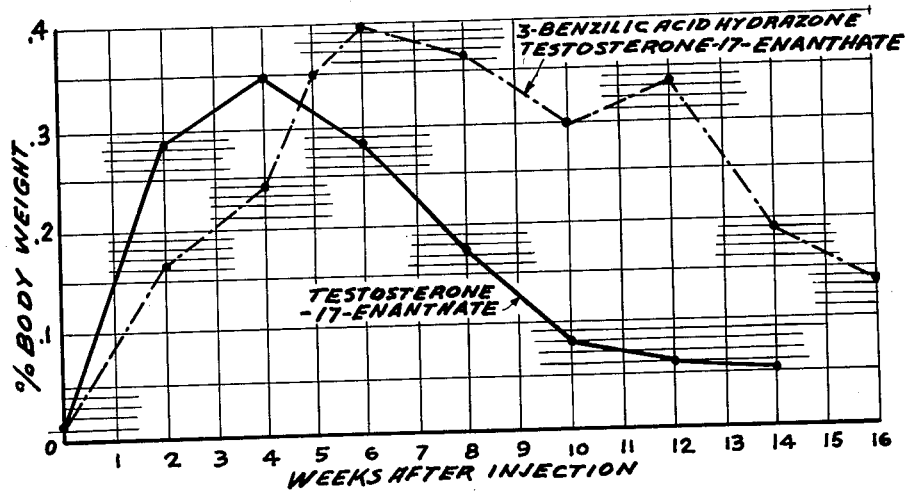
FIGURE 1 shows the change in weight of the prostates, over a period of 16 weeks using testosterone-17-enanthate and 3-benzilic acid hydrazone-testosterone-17-enanthate.
Figure 2:
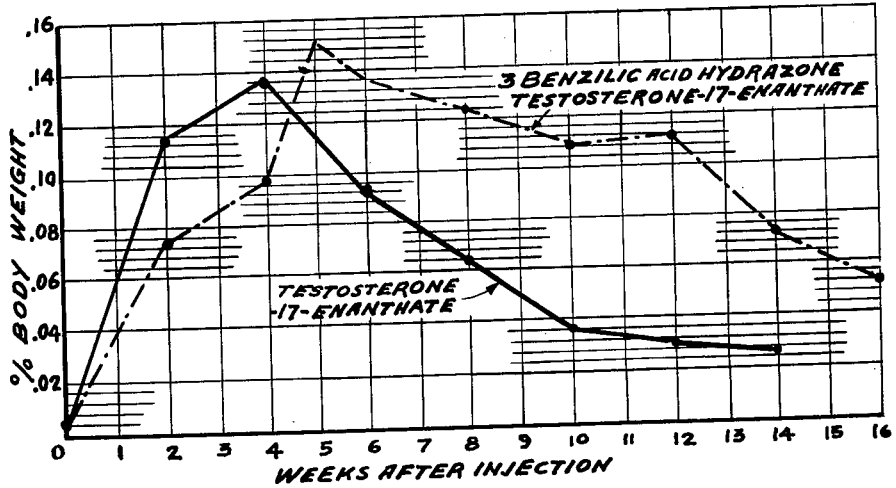
FIGURE 2 shows the changes in weight of the seminal vesicles for the same period when using the same testosterone derivatives.

When the two sets of curves of FIGURES 1 and 2 are compared, it can be seen that the effect of testosterone enanthate is maximal at about 4 weeks and then declines, whereas, from the sixth to the twelfth weeks, equally high or higher weight increases are obtained and maintained with 3-benzilic acid hydrazone-testosterone-17-enanthate. In the curves of FIGURE 3, it is seen that oestrus is produced with estrone-3-enanthate in 100% of the animals within four days, and that 50% of the animals were still in oestrus at eight weeks. The 17-benzilic acid hydrazone-estrone-3-enanthate also produced oestrus in 100% of the animals in four days, but the duration of oestrus was prolonged and 50% of the animals were still in oestrus at twelve weeks.

The 3-benzilic acid hydrazone-testosterone-17-enanthate, testosterone-17-enanthate were administered by intramuscular injection in a vegetable oil, such as corn oil and oestrone-3-enanthate and 17-benzilic acid hydrazone-estrone-3-enanthate were administered subcutaneously in a vegetable oil, such as corn oil.

The following examples illustrate a process for the manufacture of steroid hydrazones of the present invention.

EXAMPLE 1

*3-Benzilic Acid Hydrazone-Testosterone-17-Enanthate*

5.0 g. of testosterone-17-enanthate and 3.1 g. of benzilic acid hydrazide are heated under reflux for 2 hours in 150 cc. of methanol and 1 cc. of glacial acetic acid. The solvents are removed by distillation and the residue is crystallized from a mixture of isopropyl- and diethyl ethers.
M.P. 108–110° C.
$[\alpha]_D +156.0°$ (ethanol).

EXAMPLE 2

*3-Benzilic Acid Hydrazone-Testosterone-17-Propionate*

2.0 g. of testosterone-17-propionate and 1.7 g. of benzilic acid hydrazide are heated under reflux for two hours in 50 cc. of methanol and 0.4 cc. of glacial acetic acid. The solvents are removed by distillation, and the residue is crystallized from a mixture of isopropyl- and diethyl-ethers.
M.P. 132–135° C.
$[\alpha]_D +141.5°$ (ethanol).

EXAMPLE 3

*3-Mandelic Acid Hydrazone-Testosterone-17-Enanthate*

5.0 g. of testosterone-17-enanthate and 2.07 g. of mandelic acid hydrazide are heated under reflux for 2 hours in 130 cc. of methanol and 1 cc. of glacial acetic acid. The solvents are removed by distillation and the residue is crystallized from a mixture of diethyl ether and methanol.
M.P. 165–168° C.
$[\alpha]_D +113.0°$ (ethanol).

EXAMPLE 4

*3-Benzilic Acid Hydrazone-Testosterone-17-Benzoate*

1.5 g. of testosterone-17-benzoate and 0.93 g. of benzilic acid hydrazide are heated under reflux for 2 hours in 40 cc. of methanol and 0.3 cc. of glacial acetic acid. The solvents are removed by distillation and the residue is crystallized from a mixture of diethyl ether and n-hexane.
M.P. 146–148° C.
$[\alpha]_D +215.8°$ (ethanol).

EXAMPLE 5

*3-Phenylacetic Acid Hydrazone-Testosterone-17-Propionate*

1.5 g. of testosterone-17-propionate and 0.7 g. of phenylacetic acid hydrazide are dissolved in 37 cc. of methanol and 0.3 cc. of glacial acetic acid and refluxed for 2 hours. The solvents are removed by distillation and the residue is crystallized from a mixture of methanol and isopropyl ether.
M.P. 130–133° C.
$[\alpha]_D +141.5°$ (ethanol).

EXAMPLE 6

*3-Diphenylacetic Acid Hydrazone-Testosterone-17-Enanthate*

1.6 g. of testosterone-17-enanthate and 1.0 g. of diphenylacetic acid hydrazide are dissolved in 42 cc. of methanol and 0.32 cc. of glacial acetic acid and refluxed for 2 hours. The product crystallizes directly from the reaction mixture.
M.P. 209–211° C.
$[\alpha]_D +181.9°$ (chloroform).

EXAMPLE 7

*3-Mandelic Acid Hydrazone Testosterone-17-Cyclohexylpropionate*

1.5 g. of testosterone-17-cyclohexylpropionate and 0.6 g. of mandelic acid hydrazide are dissolved in 36 cc. of methanol and 0.3 cc. of glacial acetic acid and refluxed for 2 hours. After removal of solvents the residue is crystallized from ether-hexane.
M.P. 179–181° C.
$[\alpha]_D +150.8°$ (ethanol).

EXAMPLE 8

*3-Phenylacetic Acid Hydrazone-Testosterone-17-Benzoate*

1.5 g. of testosterone-17-benzoate and 0.7 g. of phenylacetic acid hydrazide are refluxed for 2 hours in 37 cc. of methanol, 10 cc. of benzene and 0.3 cc. of glacial acetic acid. After removal of the solvent the product is obtained as an amorphous solid.
M.P. 115–119° C.
$[\alpha]_D +221.9°$ (chloroform).

EXAMPLE 9

*3-Diphenylacetic Acid Hydrazone Testosterone-17-Benzoate*

1.5 g. of testosterone-17-benzoate and 0.87 g. of diphenylacetic acid hydrazide are refluxed for 2 hours in 39 cc. of methanol, 10 cc. of benzene and 0.3 cc. of glacial acetic acid. After removal of the solvent, the product is obtained as an amorphous solid.
M.P. 138–144° C.
$[\alpha]_D +208.9°$ (chloroform).

EXAMPLE 10

*3-Diphenylacetic Acid Hydrazone-Testosterone-17-Propionate*

0.9 g. of testosterone-17-propionate and 0.6 g. of diphenylacetic acid hydrazide are refluxed for 2 hours in 25 cc. of methanol and 0.2 cc. of glacial acetic acid. The product crystallizes from methanol.
M.P. 242–247° C.
$[\alpha]_D +186.9°$ (chloroform).

EXAMPLE 11

*3-Benzilic Acid Hydrazone-Testosterone-17-Cyclohexylpropionate*

1.4 g. of testosterone-17-cyclohexylpropionate and 0.8 g. of benzilic acid hydrazide are dissolved in 36 cc. of methanol and 0.3 cc. of glacial acetic acid and refluxed for 2 hours. After distillation of the solvent, the product is obtained as an amorphous solid.
M.P. 87–90.0° C.
$[\alpha]_D +141.1°$ (ethanol).

EXAMPLE 12

*3-Benzilic Acid Hydrazone-19-Nortestosterone-17-Propionate*

1.2 g. of 19-nortestosterone-17-propionate and 0.8 g. of benzilic acid hydrazide are dissolved in 32 cc. of methanol and 0.24 cc. of glacial acetic acid and refluxed for 2 hours. After removal of the solvent, the product is obtained as an amorphous solid.
M.P. 103–107° C.
$[\alpha]_D +101.0°$ (ethanol).

EXAMPLE 13

*17-Benzilic Acid Hydrazone-Estrone-3-Enanthate*

3.0 g. of estrone-3-enanthate and 2.0 g. of benzilic acid hydrazide are heated under reflux for 2 hours in 80 cc. of methanol and 0.6 cc. of glacial acetic acid. The solvents are removed by distillation and the residue is crystallized from a mixture of isopropyl- and diethyl-ethers.
M.P. 104–106° C.
$[\alpha]_D +72.5°$ (dioxane).

EXAMPLE 14

*17-Benzilic Acid Hydrazone-Estrone-3-Benzoate*

1.5 g. of estrone-3-benzoate and 0.98 g. of benzilic acid hydrazide are refluxed for 2 hours in 40 cc. of methanol, 10 cc. of benzene and 0.3 cc. of glacial acetic acid. The solvents are removed by distillation and the residue is crystallized from ethanol.
M.P. 139–142° C.
$[\alpha]_D +85.0°$ (chloroform).

EXAMPLE 15

*17-Mandelic Acid Hydrazone-Estrone-3-Propionate*

1.0 g. of estrone-3-propionate and 0.55 g. of mandelic acid hydrazide are refluxed for 2 hours in 26 cc. of methanol and 0.2 cc. of glacial acetic acid. After distillation of the solvent, the product is obtained as an amorphous solid.

M.P. 85–103° C.
$[\alpha]_D$ +72.0° (ethanol).

EXAMPLE 16

*17-Mandelic Acid Hydrazone-Estrone-3-Benzoate*

1.0 g. of estrone-3-benzoate and 0.5 g. of mandelic acid hydrazide are refluxed for 2 hours in 25 cc. of methanol and 0.2 cc. glacial acetic acid. After removal of the solvents, the product is crystallized from aqueous methanol.

M.P. 137–143° C.
$[\alpha]_D$ +57.1° (chloroform).

EXAMPLE 17

*17-Phenylacetic Acid Hydrazone-Estrone-3-Cyclohexylpropionate*

1.0 g. of estrone-3-cyclohexylpropionate and 0.45 g. of phenylacetic acid hydrazide are dissolved in 25 cc. of methanol and 0.2 cc. of glacial acetic acid and refluxed for 2 hours. The product crystallizes from methanol.

M.P. 190–193° C.
$[\alpha]_D$ +21.6° (chloroform).

EXAMPLE 18

*17-Diphenylacetic Acid Hydrazone-Estrone-3-Cyclohexylpropionate*

1.0 g. of estrone-3-cyclohexylpropionate and 0.55 g. of diphenylacetic acid hydrazide are dissolved in 25 cc. of methanol and 0.2 cc. of glacial acetic acid and refluxed for 2 hours. The product crystallizes from methanol.

M.P. 203–206° C.
$[\alpha]_D$ +48.6° (chloroform).

EXAMPLE 19

*17-Benzilic Acid Hydrazone-Estrone-3-Cyclohexylpropionate*

1.5 g. of estrone-3-cyclohexylpropionate and 0.65 g. of benzilic acid hydrazide are dissolved in 36.5 of methanol and 0.3 cc. of glacial acetic acid and refluxed for 2 hours. After removal of the solvents, the product is crystallized from a mixture of isopropyl- and diethyl-ethers.

M.P. 148–149° C.
$[\alpha]_D$ +56.6° (chloroform).

EXAMPLE 20

*17-Phenylacetic Acid Hydrazone-Estrone-3-Enanthate*

1.0 g. of estrone-3-enanthate and 0.4 g. of phenylacetic acid hydrazide are dissolved in 24 cc. of methanol and 0.2 cc. of glacial acetic acid and refluxed for 2 hours. The product crystallizes from methanol.

M.P. 168–174° C.
$[a]_D$ +45.6° (chloroform).

EXAMPLE 21

*17-Diphenylacetic Acid Hydrazone-Estrone-3-Propionate*

1.0 g. of estrone-3-propionate and 0.7 g. of diphenylacetic acid hydrazide are dissolved in 27 cc. of methanol and 0.2 cc. of glacial acetic acid and refluxed for 2 hours. After removal of the solvent, the product is crystallized from a mixture of benzene and methanol.

M.P. 133–135° C.
$[\alpha]_D$ +58.5° (chloroform).

EXAMPLE 22

*3-Benzilic Acid Hydrazone-Progesterone-17-Propionate*

0.5 g. of progesterone-17-propionate and 0.32 g. of benzilic acid hydrazide are refluxed for 2 hours in 14 cc. of methanol and 0.1 cc. of glacial acetic acid. After removal of the solvent, the product is obtained from aqueous methanol.

M.P. 145–147° C.
$[\alpha]_D$ +138.2° (ethanol).

EXAMPLE 23

*3-Benzilic Acid Hydrazone-Progesterone-17-Enanthate*

0.5 g. of progesterone-17-enanthate and 0.28 g. of benzilic acid hydrazide are refluxed for 2 hours in 13 cc. of methanol and 0.1 cc. of glacial acetic acid. After removal of the solvent, the product is obtained from aqueous methanol.

M.P. 89–101° C.
$[\alpha]_D$ +112.3° (chloroform).

EXAMPLE 24

*3-Benzilic Acid Hydrazone-Testosterone-17α-Ethinyl-17-Propionate*

0.5 g. of testosterone-17α-ethinyl-17-propionate and 0.33 g. of benzilic acid hydrazide are refluxed for 2 hours in 15 cc. of methanol and 0.1 cc. of glacial acetic acid. After removal of the solvent, the product is crystallized from a mixture of isopropyl- and diethyl-ethers.

M.P. 149–152° C.
$[\alpha]_D$ +94.3° (ethanol).

EXAMPLE 25

*3-Benzilic Acid Hydrazone-Testosterone-17α-Ethinyl-17-Enanthate*

0.5 g. of testosterone-17α-ethinyl-17-enanthate and 0.28 g. of benzilic acid hydrazide are refluxed for 2 hours in 13 cc. of methanol and 0.1 cc. of glacial acetic acid. After removal of the solvent, the product is crystallized from a mixture of isopropyl- and diethyl-ethers.

M.P. 138–140° C.
$[\alpha]_D$ +97.6° (ethanol).

EXAMPLE 26

*3-Benzilic Acid Hydrazone-Desoxycorticosterone-21-Acetate*

2.0 g. of desoxycorticosterone-21-acetate and 1.6 g. of benzilic acid hydrazide are refluxed for 2 hours in 56 cc. of methanol and 0.4 cc. of glacial acetic acid. After removal of the solvent, the product is crystallized from methanol.

M.P. 133–136° C.
$[\alpha]_D$ +202° (ethanol).

EXAMPLE 27

*3-Benzilic Acid Hydrazone-Desoxycorticosterone-21-Enanthate*

2.8 g. of desoxycorticosterone-21enanthate and 1.7 g. of benzilic acid hydrazide are refluxed for 2 hours with 73 cc. of methanol and 0.56 cc. of glacial acetic acid. After removal of the solvent, the product was obtained as an amorphous solid from aqueous methanol.

M.P. 118–134° C.
$[\alpha]_D$ +172.0° (chloroform).

This application is a continuation-in-part of my application Serial Number 687,175, filed on September 30, 1957, now abandoned.

I claim:

1. A method comprising administering to an animal in order to impart prolonged testosterone activity the compound testosterone-17-enanthate-3-benzilic acid hydrazone.

2. A method comprising administering to an animal in order to impart prolonged estrone activity the compound estrone-3-enanthate-17-benzilic acid hydrazone.

3. A method comprising administering to an animal in order to impart prolonged testosterone activity testosterone-17-alkanoate-3-benzilic acid hydrazone where the alkanoic acid is a monoalkanoic acid having 2 to 10 carbon atoms.

4. A method comprising administering to an animal in order to impart prolonged estrone activity estrone-17-alkanoate-3-benzilic acid hydrazone where the alkanoic acid is a monoalkanoic acid having 2 to 10 carbon atoms.

References Cited in the file of this patent

UNITED STATES PATENTS

| | | |
|---|---|---|
| 2,678,932 | Buck et al. | May 18, 1954 |
| 2,708,673 | Levin et al. | May 17, 1955 |
| 2,749,356 | Velluz | June 5, 1956 |
| 2,793,159 | Johnson | May 21, 1957 |
| 2,801,202 | Poetsch | July 30, 1957 |
| 2,881,192 | Velluz | Apr. 7, 1959 |
| 2,953,494 | Cook | Sept. 20, 1960 |